(12) United States Patent
Zack et al.

(10) Patent No.: US 11,143,838 B2
(45) Date of Patent: Oct. 12, 2021

(54) OPTICAL ELEMENT RETAINERS

(71) Applicant: N2 Imaging Systems, LLC, Irvine, CA (US)

(72) Inventors: Darren M. Zack, Yorba Linda, CA (US); Jay Meyer, Snohomish, WA (US); Justin Jun, Irvine, CA (US); Scott Richman, Irvine, CA (US)

(73) Assignee: N2 Imaging Systems, LLC, Irvine, CA (US)

( * ) Notice: Subject to any disclaimer, the term of this patent is extended or adjusted under 35 U.S.C. 154(b) by 0 days.

(21) Appl. No.: 16/242,448

(22) Filed: Jan. 8, 2019

(65) Prior Publication Data
US 2020/0218029 A1 Jul. 9, 2020

(51) Int. Cl.
*G02B 7/02* (2021.01)
*G02B 7/00* (2021.01)

(52) U.S. Cl.
CPC ............. *G02B 7/026* (2013.01); *G02B 7/004* (2013.01); *G02B 7/021* (2013.01); *G02B 7/023* (2013.01)

(58) Field of Classification Search
CPC . G02B 7/00; G02B 7/02; G02B 7/026; G02B 7/021; G02B 7/025; G02B 7/028; G02B 7/023; G02B 7/004; G02B 27/00; G02B 27/0018
USPC ....... 359/819, 820, 808, 811, 818, 611, 703, 359/704, 740, 900
See application file for complete search history.

(56) References Cited

U.S. PATENT DOCUMENTS

| | | |
|---|---|---|
| 2,452,592 A | 11/1948 | Meyer |
| 2,627,659 A | 2/1953 | Murr |
| 2,643,845 A | 6/1953 | Baker |
| 2,901,750 A | 9/1959 | McMurry |
| 2,901,751 A | 9/1959 | Gales et al. |
| 2,908,943 A | 10/1959 | Miller |
| 3,320,619 A | 5/1967 | Lastnik et al. |
| 3,413,656 A | 12/1968 | Vogliano et al. |
| 3,419,334 A | 12/1968 | Hubbard |
| 3,594,061 A | 7/1971 | Selvage et al. |
| 3,594,062 A | 7/1971 | Disley |
| 3,640,635 A | 2/1972 | Von Hollen |
| 3,669,523 A | 6/1972 | Edwards |
| 4,044,399 A | 8/1977 | Morton |
| 4,183,646 A | 1/1980 | Tsunefuji |

(Continued)

FOREIGN PATENT DOCUMENTS

| | | |
|---|---|---|
| CN | 202057884 | 11/2011 |
| CN | 204730844 | 10/2015 |

(Continued)

OTHER PUBLICATIONS

"Aluminum Circuit Boards", EPEC, 2018, in 6 pages. URL: https://www.epectec.com/pcb/aluminum-circuit-boards.html.

(Continued)

*Primary Examiner* — Jie Lei
(74) *Attorney, Agent, or Firm* — Knobbe, Martens, Olson & Bear, LLP

(57) ABSTRACT

An optical element retainer includes a ring body defined about a central axis. The ring body includes an inner diametric surface, an outer diametric surface opposed to the inner diametric surface, a first annular axial surface, and a plurality of flexures extending from a second annular axial surface opposite the first annular axial surface.

12 Claims, 2 Drawing Sheets

(56) References Cited

U.S. PATENT DOCUMENTS

| | | |
|---|---|---|
| 4,198,872 A | 4/1980 | Metz |
| 4,415,952 A | 11/1983 | Hattori et al. |
| 4,584,776 A | 4/1986 | Shepherd |
| 4,601,540 A | 7/1986 | Karning et al. |
| 4,605,281 A | 8/1986 | Hellewell |
| 4,630,903 A | 12/1986 | Jones |
| 4,698,489 A | 10/1987 | Morley |
| 4,758,719 A | 7/1988 | Sasaki et al. |
| 4,786,966 A | 11/1988 | Hanson et al. |
| 4,792,206 A | 12/1988 | Skuratovsky |
| 4,840,451 A | 6/1989 | Sampson et al. |
| 4,896,552 A | 1/1990 | Virga |
| 5,005,213 A | 4/1991 | Hanson et al. |
| 5,035,472 A | 7/1991 | Hansen |
| 5,125,394 A | 6/1992 | Chatenever et al. |
| 5,128,807 A | 7/1992 | Blackmon |
| 5,140,151 A | 8/1992 | Weiner et al. |
| 5,144,533 A | 9/1992 | Annett |
| 5,263,381 A | 11/1993 | Shirai |
| 5,303,606 A | 4/1994 | Kokinda |
| 5,303,688 A | 4/1994 | Chiuminatta et al. |
| 5,359,675 A | 10/1994 | Siwoff |
| 5,408,359 A | 4/1995 | Ferrett et al. |
| 5,448,161 A | 9/1995 | Byerley, III et al. |
| 5,463,495 A | 10/1995 | Murg |
| 5,492,030 A | 2/1996 | Benton et al. |
| 5,513,440 A | 5/1996 | Murg |
| 5,535,053 A | 7/1996 | Baril et al. |
| 5,584,137 A | 12/1996 | Teetzel |
| 5,623,367 A | 4/1997 | Immel |
| 5,644,951 A | 7/1997 | Hatamura |
| 5,651,081 A | 7/1997 | Blew et al. |
| 5,653,034 A | 8/1997 | Bindon |
| 5,668,904 A | 9/1997 | Sutherland et al. |
| 5,687,271 A | 11/1997 | Rabinowitz |
| 5,711,104 A | 1/1998 | Schmitz |
| 5,749,265 A | 5/1998 | Namimatsu et al. |
| 5,754,350 A * | 5/1998 | Sato ............... G02B 7/026 359/808 |
| 5,802,914 A | 9/1998 | Fassler et al. |
| 5,813,990 A | 9/1998 | Ryll |
| 5,842,054 A | 11/1998 | Suzuki et al. |
| 5,847,753 A | 12/1998 | Gabello et al. |
| 5,881,449 A | 3/1999 | Ghosh et al. |
| 5,903,996 A | 5/1999 | Morley |
| 5,946,132 A | 8/1999 | Phillips |
| 5,949,565 A | 9/1999 | Ishida |
| 5,953,761 A | 9/1999 | Jurga et al. |
| 5,956,444 A | 9/1999 | Duda et al. |
| 5,958,556 A | 9/1999 | McCutcheon |
| 5,959,705 A | 9/1999 | Fergason |
| 6,020,994 A | 2/2000 | Cook |
| 6,057,966 A | 5/2000 | Carroll et al. |
| 6,069,656 A | 5/2000 | Silver |
| 6,200,041 B1 | 3/2001 | Gaio et al. |
| 6,233,153 B1 | 5/2001 | Baur et al. |
| 6,272,692 B1 | 8/2001 | Abraham |
| 6,311,576 B1 | 11/2001 | Pletschet |
| 6,327,381 B1 | 12/2001 | Rogina et al. |
| 6,349,003 B1 | 2/2002 | Ko |
| 6,369,941 B2 | 4/2002 | Zadravec |
| 6,381,081 B1 | 4/2002 | Ford |
| 6,404,961 B1 | 6/2002 | Bonja et al. |
| 6,456,497 B1 | 9/2002 | Palmer |
| 6,519,890 B1 | 2/2003 | Otterman |
| 6,560,029 B1 | 5/2003 | Dobbie et al. |
| 6,574,053 B1 | 6/2003 | Spinali |
| 6,615,531 B1 | 9/2003 | Holmberg |
| 6,690,866 B2 | 2/2004 | Bonja et al. |
| 6,714,708 B2 | 3/2004 | McAlpine et al. |
| 6,737,596 B1 | 5/2004 | Hein |
| 6,807,742 B2 | 10/2004 | Schick et al. |
| 6,816,381 B2 | 11/2004 | Takeuchi |
| 6,898,192 B2 | 5/2005 | Chheda et al. |
| 6,901,221 B1 | 5/2005 | Jiang et al. |
| 7,016,579 B2 | 3/2006 | Militaru et al. |
| 7,062,796 B1 | 6/2006 | Dixon |
| D524,785 S | 7/2006 | Huang |
| 7,069,685 B2 | 7/2006 | Houde-Walter |
| 7,075,738 B2 | 7/2006 | Ross et al. |
| 7,096,512 B2 | 8/2006 | Blair |
| 7,128,475 B2 | 10/2006 | Kesler |
| 7,132,648 B2 | 11/2006 | Ratiff et al. |
| 7,156,564 B2 | 1/2007 | Watanabe et al. |
| 7,166,812 B2 | 1/2007 | White et al. |
| 7,171,776 B2 | 2/2007 | Staley, III |
| 7,194,012 B2 | 3/2007 | Mason et al. |
| 7,199,945 B2 | 4/2007 | Tsuzuki |
| 7,210,262 B2 | 5/2007 | Florence et al. |
| 7,210,392 B2 | 5/2007 | Greene et al. |
| 7,219,370 B1 | 5/2007 | Teetzel et al. |
| 7,278,734 B2 | 10/2007 | Jannard et al. |
| 7,292,262 B2 | 11/2007 | Towery et al. |
| 7,298,941 B2 | 11/2007 | Palen et al. |
| 7,319,557 B2 | 1/2008 | Tai |
| 7,369,302 B2 | 5/2008 | Gaber |
| 7,409,792 B2 | 8/2008 | Narcy et al. |
| 7,437,848 B2 | 10/2008 | Chang |
| 7,462,035 B2 | 12/2008 | Lee et al. |
| 7,488,294 B2 | 2/2009 | Torch |
| 7,505,053 B2 | 3/2009 | Brown Elliott et al. |
| 7,552,559 B2 | 6/2009 | Day |
| 7,609,467 B2 | 10/2009 | Blanding et al. |
| 7,612,956 B2 | 11/2009 | Blanding et al. |
| 7,627,975 B1 | 12/2009 | Hines |
| 7,634,189 B2 | 12/2009 | Hong et al. |
| 7,649,550 B2 | 1/2010 | Ishiyama et al. |
| 7,676,137 B2 | 3/2010 | Schick et al. |
| 7,690,849 B2 | 4/2010 | Scharf et al. |
| 7,701,493 B2 | 4/2010 | Mauritzson |
| 7,705,855 B2 | 4/2010 | Brown Elliott |
| 7,710,654 B2 | 5/2010 | Ashkenazi et al. |
| 7,730,820 B2 | 6/2010 | Vice et al. |
| 7,740,499 B1 | 6/2010 | Willey et al. |
| 7,744,286 B2 | 6/2010 | Lu et al. |
| 7,768,703 B2 | 8/2010 | Winker et al. |
| 7,787,012 B2 | 8/2010 | Scales et al. |
| 7,795,574 B2 | 9/2010 | Kennedy et al. |
| 7,800,065 B2 | 9/2010 | Konkle et al. |
| 7,800,852 B2 | 9/2010 | Blanding et al. |
| 7,805,080 B2 | 9/2010 | Wang et al. |
| 7,827,723 B1 | 11/2010 | Zaderey et al. |
| 7,832,023 B2 | 11/2010 | Crisco |
| 7,842,922 B2 | 11/2010 | Leneke et al. |
| 7,885,495 B2 | 2/2011 | Koitabashi |
| 7,899,332 B2 | 3/2011 | Shindou et al. |
| 7,911,687 B2 | 3/2011 | Scholz |
| 7,916,156 B2 | 3/2011 | Brown Elliott et al. |
| 7,933,464 B2 | 4/2011 | Zhang et al. |
| 7,952,059 B2 | 5/2011 | Vitale et al. |
| 7,965,305 B2 | 6/2011 | Miller et al. |
| 7,972,067 B2 | 7/2011 | Haley et al. |
| 7,990,523 B2 | 8/2011 | Schlierbach et al. |
| 8,004,769 B2 | 8/2011 | Spaller |
| 8,014,679 B2 | 9/2011 | Yamazaki |
| 8,051,729 B2 | 11/2011 | Yoshida et al. |
| 8,063,934 B2 | 11/2011 | Donato |
| 8,067,735 B2 | 11/2011 | King et al. |
| 8,082,688 B2 | 12/2011 | Elpedes et al. |
| 8,085,482 B2 | 12/2011 | Frankovich et al. |
| 8,093,992 B2 | 1/2012 | Jancic et al. |
| 8,112,185 B2 | 2/2012 | Wu |
| 8,153,975 B2 | 4/2012 | Hollander et al. |
| 8,225,542 B2 | 7/2012 | Houde-Walter |
| 8,253,105 B1 | 8/2012 | Warnke et al. |
| 8,312,667 B2 | 11/2012 | Thomas et al. |
| 8,336,776 B2 | 12/2012 | Horvath et al. |
| 8,337,036 B2 | 12/2012 | Soto et al. |
| 8,350,796 B2 | 1/2013 | Tomizawa et al. |
| 8,365,455 B2 | 2/2013 | Davidson |
| 8,375,620 B2 | 2/2013 | Staley, III |
| 8,379,307 B2 | 2/2013 | Thomas et al. |
| D677,298 S | 3/2013 | Hallgren |
| 8,411,346 B2 | 4/2013 | Sapir |

(56) References Cited

U.S. PATENT DOCUMENTS

| | | |
|---|---|---|
| 8,488,969 B1 | 7/2013 | Masarik |
| 8,526,108 B2 | 9/2013 | Weinold et al. |
| 8,531,592 B2 | 9/2013 | Teetzel et al. |
| 8,532,490 B2 | 9/2013 | Smith et al. |
| 8,656,628 B2 | 2/2014 | Jock et al. |
| 8,672,491 B2 | 3/2014 | Immel |
| 8,717,392 B2 | 5/2014 | Levola |
| 8,720,102 B2 | 5/2014 | Allen et al. |
| 8,739,313 B2 | 6/2014 | Teetzel et al. |
| 8,773,766 B2 | 7/2014 | Jannard et al. |
| 8,776,422 B2 | 7/2014 | Dodd et al. |
| 8,781,273 B2 | 7/2014 | Benjamin et al. |
| 8,826,583 B2 | 9/2014 | Kepler et al. |
| 8,849,379 B2 | 9/2014 | Abreu |
| 8,874,284 B2 | 10/2014 | Sanders-Reed |
| 8,886,046 B2 | 11/2014 | Masarik |
| 8,903,317 B2 | 12/2014 | Wu |
| 8,908,045 B2 | 12/2014 | Stewart |
| 8,915,008 B2 | 12/2014 | Mauricio et al. |
| 8,919,724 B2 * | 12/2014 | Rangaswamy ........ G02B 7/028 248/603 |
| 8,923,703 B2 | 12/2014 | Masarik |
| 8,928,878 B2 | 1/2015 | Jaeschke et al. |
| 8,942,632 B2 | 1/2015 | Shen |
| 8,963,573 B2 | 2/2015 | Achkir et al. |
| 8,984,665 B2 | 3/2015 | Celona et al. |
| 9,042,105 B2 | 5/2015 | Malek et al. |
| 9,042,736 B2 | 5/2015 | Masarik |
| 9,052,153 B2 | 6/2015 | Oh et al. |
| 9,057,583 B2 | 6/2015 | Matthews et al. |
| 9,059,562 B2 | 6/2015 | Priest et al. |
| 9,069,001 B2 | 6/2015 | Braman et al. |
| 9,093,231 B2 | 7/2015 | Fujita et al. |
| 9,113,061 B1 | 8/2015 | Morley |
| 9,115,956 B2 | 8/2015 | Hakanson et al. |
| 9,121,671 B2 | 9/2015 | Everett |
| 9,170,068 B2 | 10/2015 | Crispin |
| 9,191,583 B2 | 11/2015 | Hamrelius et al. |
| 9,225,419 B2 | 12/2015 | Masarik |
| 9,246,579 B2 | 1/2016 | Hara et al. |
| 9,285,589 B2 | 3/2016 | Osterhout et al. |
| 9,303,952 B2 | 4/2016 | Hakansson et al. |
| 9,310,163 B2 | 4/2016 | Bay |
| 9,316,462 B2 | 4/2016 | Varshneya |
| 9,319,143 B2 | 4/2016 | El-Ahmadi et al. |
| 9,335,122 B2 | 5/2016 | Choiniere |
| 9,366,504 B2 | 6/2016 | Hester et al. |
| 9,372,051 B2 | 6/2016 | Kepler et al. |
| 9,373,277 B2 | 6/2016 | Sagan |
| 9,389,677 B2 | 7/2016 | Hobby et al. |
| 9,429,391 B2 | 8/2016 | Walker |
| 9,429,745 B2 | 8/2016 | Brumfield |
| 9,438,774 B2 | 9/2016 | Masarik |
| 9,466,120 B2 | 10/2016 | Maryfield et al. |
| 9,481,466 B2 | 11/2016 | Fischer et al. |
| 9,506,725 B2 | 11/2016 | Maryfield et al. |
| 9,516,202 B2 | 12/2016 | Masarik et al. |
| 9,516,266 B2 | 12/2016 | Pycock et al. |
| 9,593,913 B1 | 3/2017 | Wright et al. |
| 9,596,390 B2 | 3/2017 | Uemura et al. |
| 9,615,004 B2 | 4/2017 | Masarik |
| 9,622,529 B2 | 4/2017 | Teetzel et al. |
| 9,631,899 B2 | 4/2017 | Lebel et al. |
| 9,658,423 B2 | 5/2017 | Gustafson et al. |
| 9,696,111 B2 | 7/2017 | Saadon |
| 9,705,605 B2 | 7/2017 | Masarik |
| 9,769,902 B1 | 9/2017 | Cain et al. |
| 9,772,343 B2 | 9/2017 | Wang et al. |
| 9,816,782 B2 | 11/2017 | Maryfield et al. |
| 9,817,225 B2 | 11/2017 | Gotz et al. |
| 9,823,043 B2 | 11/2017 | Compton et al. |
| 9,861,263 B2 | 1/2018 | Kwan et al. |
| 9,891,023 B2 | 2/2018 | Compton et al. |
| 9,897,411 B2 | 2/2018 | Compton et al. |
| 9,910,259 B2 | 3/2018 | Armbruster et al. |
| 9,921,028 B2 | 3/2018 | Compton et al. |
| 9,934,739 B2 | 4/2018 | Hogan |
| 9,948,878 B2 | 4/2018 | Simolon et al. |
| 9,995,901 B2 | 6/2018 | Petersen |
| 10,003,756 B2 | 6/2018 | Masarik et al. |
| 10,024,631 B2 | 7/2018 | Portoghese et al. |
| 10,036,869 B2 | 7/2018 | Fahr et al. |
| 10,082,879 B2 | 9/2018 | Niinuma et al. |
| 10,095,089 B2 | 10/2018 | Po et al. |
| 10,101,125 B2 | 10/2018 | Conklin |
| 10,113,837 B2 | 10/2018 | Masarik et al. |
| 10,151,564 B2 | 12/2018 | Galli |
| 10,163,269 B2 | 12/2018 | Hiranandani et al. |
| 10,190,848 B2 | 1/2019 | VanBecelaere |
| 10,309,749 B2 | 6/2019 | Hamilton |
| 10,368,454 B2 | 7/2019 | Liu et al. |
| 10,379,135 B2 | 8/2019 | Maryfield et al. |
| 10,418,767 B2 | 9/2019 | Azad |
| 10,444,439 B2 | 10/2019 | Arao et al. |
| 10,458,754 B2 | 10/2019 | Miller et al. |
| 10,481,340 B2 | 11/2019 | Yakabe et al. |
| 10,492,555 B2 | 12/2019 | Lebel et al. |
| 10,557,676 B2 | 2/2020 | Masarik et al. |
| 10,584,941 B2 | 3/2020 | Masarik et al. |
| 10,645,348 B2 | 5/2020 | Moseman et al. |
| 10,673,301 B1 | 6/2020 | McAuley |
| 10,687,443 B2 | 6/2020 | Rojahn et al. |
| 10,693,341 B1 | 6/2020 | McAuley |
| 10,718,909 B2 | 7/2020 | Noll et al. |
| 10,721,000 B2 | 7/2020 | Masarik |
| 10,742,913 B2 | 8/2020 | Vaklev et al. |
| 10,753,709 B2 | 8/2020 | Neal |
| 10,782,096 B2 | 9/2020 | Pautler |
| 10,783,111 B2 | 9/2020 | Moseman |
| 10,788,508 B2 | 9/2020 | Pan et al. |
| 10,796,860 B2 | 10/2020 | Iliev et al. |
| 10,801,813 B2 | 10/2020 | Moseman et al. |
| 10,812,687 B2 | 10/2020 | Masarik et al. |
| 10,852,838 B2 | 12/2020 | Bradski et al. |
| 10,921,578 B2 | 2/2021 | Kuczek et al. |
| 10,935,345 B2 | 3/2021 | Ben Oren et al. |
| 2002/0027690 A1 | 3/2002 | Bartur et al. |
| 2004/0031184 A1 | 2/2004 | Hope |
| 2005/0114710 A1 | 5/2005 | Cornell et al. |
| 2005/0232512 A1 | 10/2005 | Luk et al. |
| 2005/0254126 A1 | 11/2005 | Lin et al. |
| 2005/0268519 A1 | 12/2005 | Pikielny |
| 2006/0165413 A1 | 7/2006 | Schemmann et al. |
| 2007/0003562 A1 | 1/2007 | Druilhe |
| 2007/0035626 A1 | 2/2007 | Randall et al. |
| 2007/0213586 A1 | 9/2007 | Hirose et al. |
| 2008/0263752 A1 | 10/2008 | Solinsky et al. |
| 2008/0309586 A1 | 12/2008 | Vitale |
| 2009/0181729 A1 | 7/2009 | Griffin, Jr. et al. |
| 2009/0308192 A1 | 12/2009 | Lin et al. |
| 2009/0316372 A1 | 12/2009 | Kozlovski |
| 2010/0027943 A1 | 2/2010 | Armani et al. |
| 2010/0149073 A1 | 6/2010 | Chaum et al. |
| 2010/0225673 A1 | 9/2010 | Miller et al. |
| 2010/0266245 A1 | 10/2010 | Sabo |
| 2010/0308999 A1 | 12/2010 | Chornenky |
| 2010/0328420 A1 | 12/2010 | Roman |
| 2011/0213664 A1 | 9/2011 | Osterhout et al. |
| 2011/0214082 A1 | 9/2011 | Osterhout et al. |
| 2012/0033195 A1 | 2/2012 | Tai |
| 2012/0097741 A1 | 4/2012 | Karcher |
| 2012/0238208 A1 | 9/2012 | Bienas et al. |
| 2012/0255213 A1 | 10/2012 | Panos |
| 2012/0311910 A1 | 12/2012 | Mironichev et al. |
| 2012/0320340 A1 | 12/2012 | Coleman, III |
| 2012/0327247 A1 | 12/2012 | Mironichev et al. |
| 2013/0016215 A1 | 1/2013 | Bitar et al. |
| 2013/0036646 A1 | 2/2013 | Rubac et al. |
| 2013/0188943 A1 | 7/2013 | Wu |
| 2013/0215395 A1 | 8/2013 | Li |
| 2014/0007485 A1 | 1/2014 | Castejon, Sr. |
| 2014/0104449 A1 | 4/2014 | Masarik et al. |
| 2014/0118986 A1 | 5/2014 | Suzuki et al. |
| 2014/0260748 A1 | 9/2014 | Traver |

(56) References Cited

U.S. PATENT DOCUMENTS

| | | |
|---|---|---|
| 2015/0226613 A1 | 8/2015 | Bauer et al. |
| 2015/0282549 A1 | 10/2015 | Lebel et al. |
| 2015/0316351 A1 | 11/2015 | Choiniere |
| 2016/0033234 A1 | 2/2016 | Swift et al. |
| 2016/0069640 A1 | 3/2016 | Pretorius |
| 2016/0327365 A1 | 11/2016 | Collin et al. |
| 2017/0010073 A1 | 1/2017 | Downing |
| 2017/0078022 A1 | 3/2017 | Masarik et al. |
| 2017/0090146 A1 | 3/2017 | Ishiguro |
| 2017/0237919 A1 | 8/2017 | Lamesch |
| 2017/0302386 A1 | 10/2017 | Masarik |
| 2018/0106568 A1 | 4/2018 | Hedeen et al. |
| 2018/0246135 A1 | 8/2018 | Pan et al. |
| 2018/0302576 A1 | 10/2018 | Masarik et al. |
| 2019/0094981 A1 | 3/2019 | Bradski et al. |
| 2019/0166174 A1 | 5/2019 | Moseman |
| 2019/0222771 A1 | 7/2019 | Hedeen et al. |
| 2019/0353461 A1 | 11/2019 | Neal et al. |
| 2019/0353462 A1 | 11/2019 | Neal |
| 2019/0376764 A1 | 12/2019 | Hammond |
| 2019/0377171 A1 | 12/2019 | Hammond et al. |
| 2020/0011640 A1 | 1/2020 | Moseman et al. |
| 2020/0018566 A1 | 1/2020 | Tubb |
| 2020/0051481 A1 | 2/2020 | Masarik et al. |
| 2020/0053303 A1 | 2/2020 | Vaklev et al. |
| 2020/0081242 A1 | 3/2020 | Kuczek et al. |
| 2020/0141700 A1 | 5/2020 | Moseman et al. |
| 2020/0142176 A1 | 5/2020 | Zack et al. |
| 2020/0146161 A1 | 5/2020 | Zack et al. |
| 2020/0256438 A1 | 8/2020 | McAuley |
| 2020/0351461 A1 | 11/2020 | Vaklev et al. |
| 2021/0006338 A1 | 1/2021 | Masarik |

FOREIGN PATENT DOCUMENTS

| | | |
|---|---|---|
| CN | 204944509 | 1/2016 |
| CN | 105423813 A | 3/2016 |
| CN | 106612141 | 5/2017 |
| EP | 0 176 169 | 4/1986 |
| EP | 2 722 632 | 4/2014 |
| EP | 2 812 749 | 12/2014 |
| EP | 3 172 524 | 5/2017 |
| EP | 3 205 974 | 8/2017 |
| EP | 3 239 754 | 11/2017 |
| EP | 3 205 974 B1 | 6/2020 |
| EP | 3 172 524 B1 | 10/2020 |
| FR | 2917566 | 12/2010 |
| GB | 2162654 | 2/1986 |
| IL | 250217 A | 1/2020 |
| JP | H07-295682 | 11/1995 |
| WO | WO 2005/121688 | 12/2005 |
| WO | WO 2013/080058 | 6/2013 |
| WO | WO 2013/102869 | 7/2013 |
| WO | WO 2013/119983 | 8/2013 |
| WO | WO 2014/062725 | 4/2014 |
| WO | WO 2014/150076 | 9/2014 |
| WO | WO 2016/014655 | 1/2016 |
| WO | WO 2019/222422 | 11/2019 |
| WO | WO 2019/222426 | 11/2019 |
| WO | WO 2020/051464 | 3/2020 |
| WO | WO 2020/096728 | 5/2020 |

OTHER PUBLICATIONS

"Aluminum PCB—Aluminum Thermal Management PCBs", Amitron Corp., 2016, in 5 pages. URL: https://web.archive.org/web/20160110130928/https://www.amitroncorp.com:80/printed-circuit-boards/aluminum.html.

"An Introduction to Aluminum PCBs by PCBGOGO", PCBGOGO, 2018, in 4 pages. URL: https://www.pcbgogo.com/article/an_introduction_to_aluminum_PCBs_by_PCBGOGO.html.

"What are the Advantages of Using a Printed Circuit Board (PCB)", Edgefx Technologies, 2017, in 8 pages. URL: http://www.edgefx.in/advantages-using-printed-circuit-board-pcb/.

Aebi, V. et al., "EBAPS: Next Generation, Low Power, Digital Night Vision", Presented at the OPTRO 2005 International Symposium, May 10, 2005, pp. 1-10, Paris, France, in 10 pages.

Ackerman, S., "It Only Took the Army 16 Years and 2 Wars to Deploy this Network", Wired.com, Jun. 28, 2012, in 7 pages. URL: http://www.wired.com/dangerrom/2012/06/army-data-network-war/all/.

Armstrong, S. C., "Project Manager Soldier Weapons Program Overview NDIA", May 15, 2012, in 38 pages.

Schott—Glass Made of Ideas, GBPS-MC-GOF-Demo, dated Jan. 2006, pp. S.1-S.8, in 8 pages.

Sklarek, W., "High Data Rate Capabilities of Multicore Glass Optical Fiber Cables, 22 FGT 'Otische Polymerfasern'", dated Oct. 25, 2006, in 19 pages. URL: http://www.pofac.de/downloads/itgfg/fgt2.2/FGT2.2_Munchen_Sklarek_GOF-Buendel.

Tao, R. et al., "10 Gb/s CMOS Limiting Amplifier for Optical links", Proceedings of the 29th European Solid-State Circuits Conference, Sep. 16-18, 2013, pp. 285-287, Estoril, Portugal, in 3 pages.

Zhu, Z. et al., "AR-Weapon: Live Augmented Reality Based First-Person Shooting System", 2015 IEEE Winter Conference on Applications of Computer Vision, Feb. 2015, in 8 pages.

\* cited by examiner

OPTICAL ELEMENT RETAINERS

BACKGROUND OF THE INVENTION

1. Field of the Invention

The present disclosure relates to optics, and more particularly, to assemblies for optical elements.

2. Description of Related Art

Use of shimming retainers and stacking with room-temperature-vulcanizing (RTV) silicone is the industry standard for accurately holding polymer optics in optical element assemblies. Polymers generally change in size with temperature changes substantially more than metals and need to be mounted with a material (such as aluminum shims or RTV) which can accommodate coefficient of thermal expansion differences between polymer optics and metal enclosures. Shimming and stacking lenses with RTV silicone is a time-consuming and costly process.

The conventional techniques have been considered satisfactory for their intended purpose. However, there is an ever-present need for improved retention of optical elements in assemblies. This disclosure provides a solution for this need.

SUMMARY OF THE INVENTION

An optical element retainer includes a ring body defined about a central axis. The ring body includes an inner diametric surface, an outer diametric surface opposed to the inner diametric surface, a first annular axial surface, and a plurality of flexures extending from a second annular axial surface opposite the first annular axial surface.

Each flexure can include an axially-extending base extending from the second annular axial surface to a radially-inwardly extending head, wherein a radially-inward surface of the head is configured to support a polymeric optical element while accommodating radial expansion and contraction thereof by radial flexure of the base. The radially-inward surface of the head of each of the flexures can have a surface finish characteristic of electrical discharge machining (EDM). The head of each flexure can include a chin surface facing the second annular axial surface, wherein the chin surface has a surface finish characteristic of lathing. The flexures can number at least sixteen. The inner and outer diametric surfaces can have surface finishes characteristic of lathing. Each flexure can include an outward surface which has a surface finish characteristic of lathing. Each flexure can include an inward surface and a pair of opposed circumferential surfaces, wherein at least one of the circumferential surfaces has a surface finish characteristic of electrical discharge machining (EDM).

An optical assembly includes an optical element retainer as described above and a polymeric optical element assembled to the flexures. Each flexure can include an axially-extending base extending from the second annular axial surface to a radially inwardly extending head, wherein a radially inward surface of the head supports the polymeric optical element while accommodating radial expansion and contraction thereof by radial flexure of the base. The polymeric optical element can be a first lens element mounted in a housing and further comprising a plurality of lens elements optically coupled to the first lens element and mounted in housing.

A method of making an optical element retainer includes lathing a ring body having an inner diametric surface, an outer diametric surface opposed to the inner diametric surface, and a first annular axial surface. The method includes forming with electrical discharge machining (EDM) at least a portion of each flexure in a plurality of flexures extending from a second annular axial surface opposite the first annual surface.

A polymeric lens can be assembled to radially inwardly facing surfaces of the flexures. Forming at least a portion of each flexure can include forming at least sixteen flexures.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
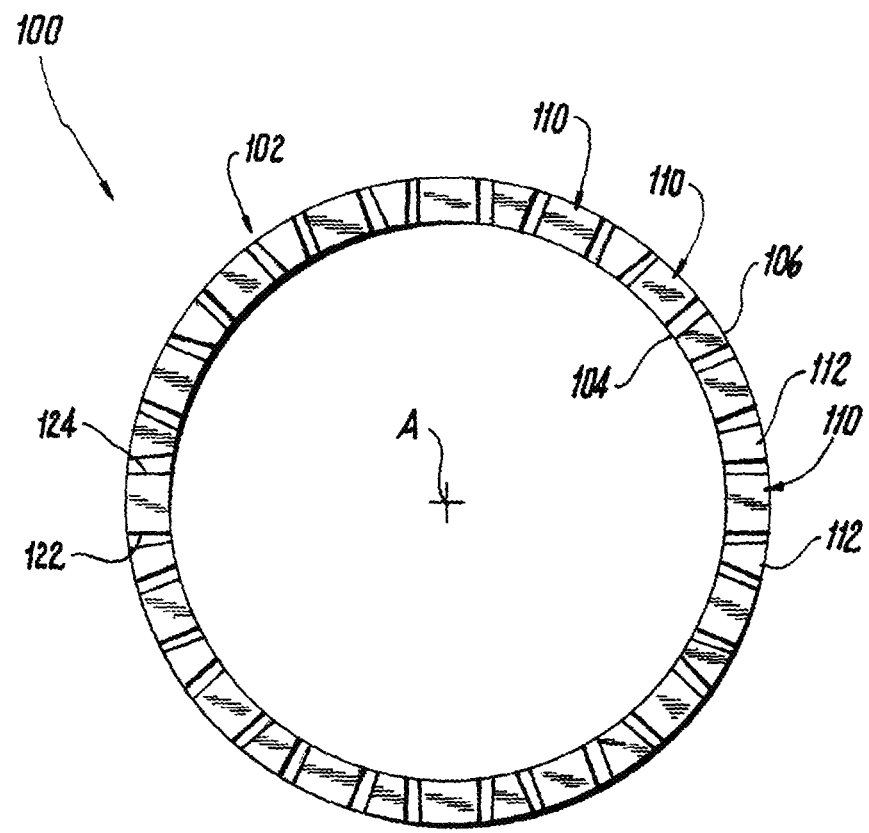
FIG. 1 is a plan view of an exemplary embodiment of an optical element retainer constructed in accordance with the present disclosure, showing the ring body.

Reference will now be made to the drawings wherein like reference numerals identify similar structural features or aspects of the subject disclosure. For purposes of explanation and illustration, and not limitation, a partial view of an exemplary embodiment of an optical element retainer in accordance with the disclosure is shown in FIG. 1 and is designated generally by reference character 100. Other embodiments of optical element retainers in accordance with the disclosure, or aspects thereof, are provided in FIGS. 2-4, as will be described. The systems and methods described herein can be used to support polymeric optical elements while accommodating thermal expansion and contraction thereof.

Figure 2:
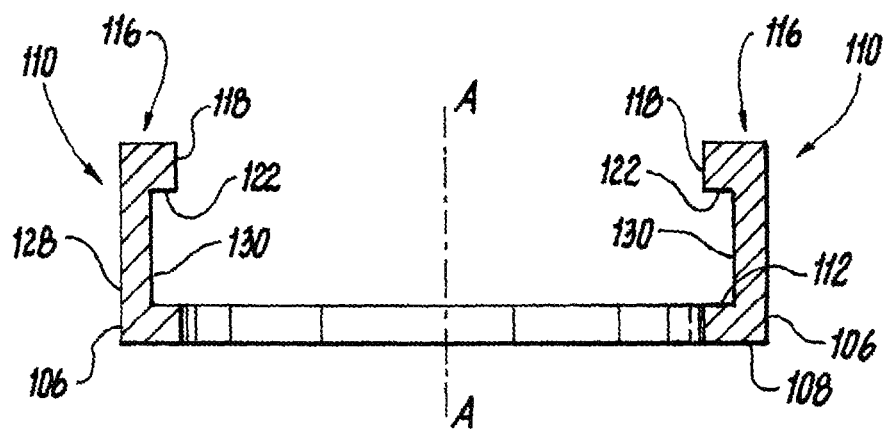
FIG. 2 is a schematic cross-sectional side elevation view of the optical element retainer of FIG. 1, showing the flexures.

The optical element retainer 100 includes a ring body 102 defined about a central axis A, which is identified in FIG. 2. The ring body 102 includes an inner diametric surface 104, an outer diametric surface 106 opposed to the inner diametric surface 104, a first annular axial surface 108 (identified in FIG. 2), and a plurality of flexures 110 (only a few of which are identified in FIG. 1 for sake of clarity) extending from a second annular axial surface 112 opposite the first annular axial surface 108.

Figure 3:
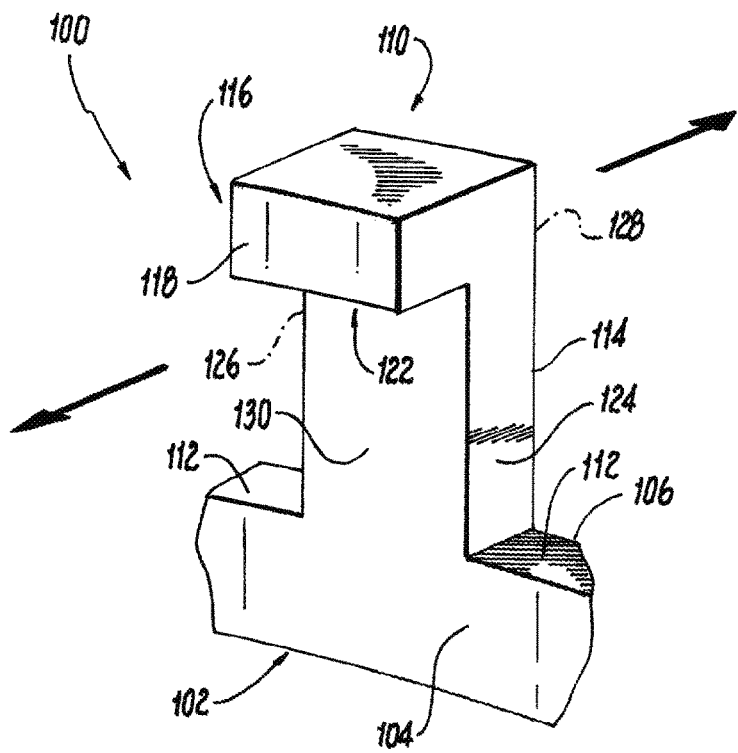
FIG. 3 is a schematic perspective view of a portion of the optical element retainer of FIG. 1, showing the circumferential surfaces of one of the flexures.

With reference now to FIG. 3, each flexure includes an axially-extending base 114 extending from the second annular axial surface 112 to a radially-inwardly extending head 116. A radially-inward surface 118 of the head 116 is configured to support a polymeric optical element 120 (identified in FIG. 4) while accommodating radial expansion and contraction thereof, e.g., from changes in temperature, by radial flexure of the base 114, e.g., in the direction indicated schematically by the large arrows in FIG. 3. The head 116 of each flexure 110 includes a chin surface 122 facing the second annular axial surface 112. Each flexure 110 includes a pair of opposed circumferential surfaces 124, 126, an outward surface 128, and an opposed inward surface 130. There can be sixteen flexures 110 or any other suitable number that will reduce errors in position of the optical element 120 so that no one flexure 110 if out of tolerance can influence the position of the optical element 120 enough to position the optical element 120 off center.

A method of making an optical element retainer (e.g. optical element retainer 100) includes lathing a ring body (e.g. ring body 102) having an inner diametric surface (e.g. inner diametric surface 104), an outer diametric surface (e.g. outer diametric surface 106) opposed to the inner diametric surface, and a first annular axial surface (e.g. first annular axial surface 108). The method includes forming with electrical discharge machining (EDM) at least a portion of each flexure in a plurality of flexures (e.g. flexures 110) extending from a second annular axial surface (e.g. surface 112) opposite the first annual surface. The entire optical element retainer 100 can thus be produced as a single, integral machined part.

With continued reference to FIG. 3, the opposed circumferential surfaces 124, 126 of each flexure 110 have surface finishes characteristic of electrical discharge machining (EDM). As a result of forming the surfaces 124, 126 with EDM, second annular axial surface surfaces 112 also can end up having EDM surface finishes. Optionally other surfaces, e.g., the radially inward surface 118 can be formed by EDM and have the corresponding EDM surface finish. The chin surface 122 of each flexure 110, the inner and outer diametric surfaces 104, 106 of the ring body 102, the outward surface 128 of each flexure 110, and the inward surface 130 can each have a surface finish characteristic of lathing, since these surfaces can be formed during the lathing.

Figure 4:
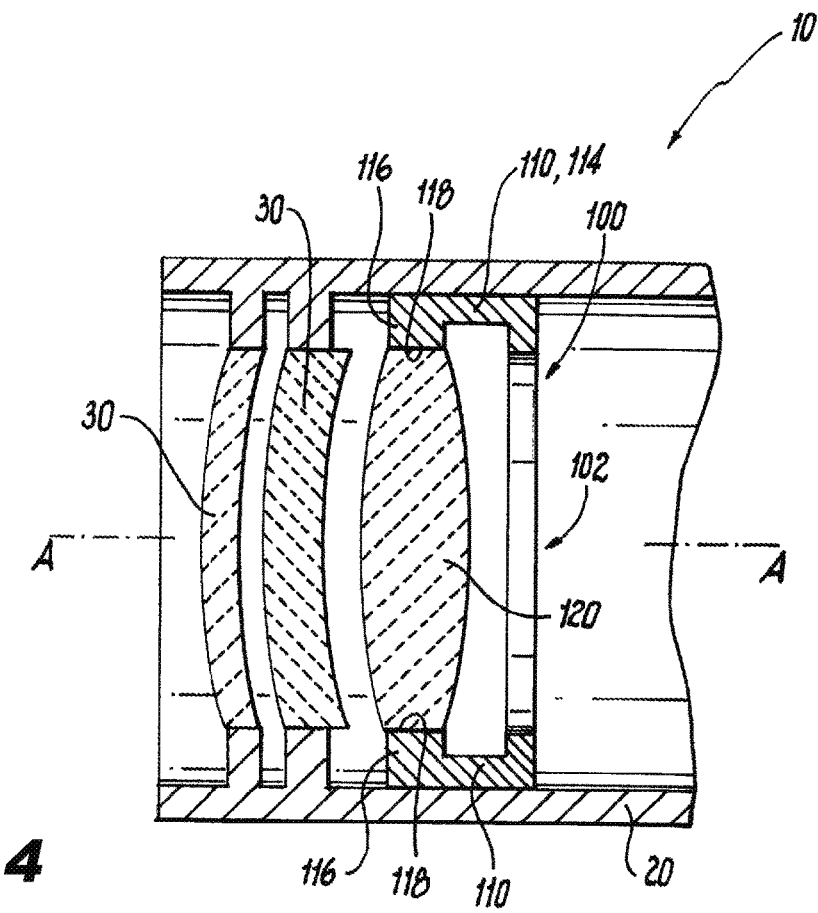
FIG. 4 is a schematic cross-sectional side elevation view of the optical element retainer of FIG. 1, showing an optical element assembled in the flexures.

With reference now to FIG. 4, an optical assembly 10 includes an optical element retainer 100 as described above with the polymeric optical element 120 assembled to the flexures 110. The radially inward surface 118 of each head 116 supports the polymeric optical element 120 while accommodating radial expansion and contraction thereof by radial flexure of the base 114 as indicated by the large arrows in FIG. 3. The polymeric optical element 120 is mounted in a housing 20, i.e., indirectly through the optical element retainer 110 being mounted to the housing 20. A plurality of additional lens elements 30 are optically coupled to the first lens element 120 and are mounted in housing 20.

The methods and systems of the present disclosure, as described above and shown in the drawings, provide for retaining optical elements with superior properties including each of manufacture and assembly and accommodation of thermal expansion and contraction of optical elements. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An optical element retainer comprising:
    a ring body defined about a central axis and having an inner diametric surface, an outer diametric surface opposed to the inner diametric surface, a first annular axial surface, and a plurality of flexures extending from a second annular axial surface opposite the first annular axial surface, wherein each flexure includes an axially extending base extending from the second annular axial surface to a radially inwardly extending head, wherein a radially inward surface of the head is substantially planar and configured to support along a planar surface of the radially inward surface a polymeric optical element at a surface-to-surface contact while accommodating radial expansion and contraction thereof by radial flexure of the base.

2. The optical element retainer as recited in claim 1, wherein the radially-inward surface the head of each of the flexures has a surface finish characteristic of electrical discharge machining (EDM).

3. The optical element retainer as recited in claim 1, wherein the head of each flexure includes a chin surface facing the second annular axial surface, wherein the chin surface has a surface finish characteristic of lathing.

4. The optical element retainer as recited in claim 1, wherein the flexures number at least sixteen.

5. The optical element retainer as recited in claim 1, wherein the inner and outer diametric surfaces have surface finishes characteristic of lathing.

6. The optical element retainer as recited in claim 1, wherein each flexure includes an outward surface which has a surface finish characteristic of lathing.

7. The optical element retainer as recited in claim 1, wherein each flexure includes a pair of opposed circumferential surfaces, wherein at least one of the circumferential surfaces has a surface finish characteristic of electrical discharge machining (EDM).

8. An optical assembly comprising:
    an optical element retainer including a ring body defined about a central axis and having an inner diametric surface, and outer diametric surface opposed to the inner diametric surface, an annular axial surface, and a plurality of flexures extending from a second annular axial surface opposite the first annular axial surface; and
    a polymeric optical element assembled to the flexures, wherein each flexure includes an axially extending base extending from the second annular axial surface to a radially inwardly extending head, wherein a radially inward surface of the head is substantially planar and configured to support along a planar surface of the radially inward surface the polymeric optical element at a surface-to-surface contact while accommodating radial expansion and contraction thereof by radial flexure of the base.

9. The assembly as recited in claim 8, wherein the polymeric optical element is a first lens element mounted in a housing and further comprising a plurality of lens elements optically-coupled to the first lens element and mounted in housing.

10. A method of making an optical element retainer comprising:
    lathing a ring body having an inner diametric surface, an outer diametric surface opposed to the inner diametric surface, and a first annular axial surface; and
    forming with electrical discharge machining (EDM) at least a portion of each flexure in a plurality of flexures extending from a second annular axial surface opposite the first annual surface, wherein each flexure includes an axially extending base extending from the second annular axial surface to a radially inwardly extending head, wherein a radially inward surface of the head is substantially planar and configured to support along a planar surface of the radially inward surface a polymeric optical element at a surface-to-surface contact while accommodating radial expansion and contraction thereof by radial flexure of the base.

11. The method as recited in claim 10, further comprising assembly the polymeric lens.

12. The method as recited in claim 10, wherein forming at least a portion of each flexure includes forming at least sixteen flexures.

* * * * *